US010200201B2

(12) United States Patent
Cho et al.

(10) Patent No.: US 10,200,201 B2
(45) Date of Patent: Feb. 5, 2019

(54) METHOD FOR APPLICATION INSTALLATION, ELECTRONIC DEVICE, AND CERTIFICATE SYSTEM

(71) Applicant: Samsung Electronics Co., Ltd., Suwon-si, Gyeonggi-do (KR)

(72) Inventors: Sung Kyu Cho, Hwaseong-si (KR); Michael Pak, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 185 days.

(21) Appl. No.: 14/680,529

(22) Filed: Apr. 7, 2015

(65) Prior Publication Data

US 2015/0288528 A1 Oct. 8, 2015

(30) Foreign Application Priority Data

Apr. 7, 2014 (KR) .......... 10-2014-0041525
Jul. 11, 2014 (KR) .......... 10-2014-0087735

(51) Int. Cl.
*H04L 9/32* (2006.01)
*G06F 8/61* (2018.01)
*G06F 21/51* (2013.01)

(52) U.S. Cl.
CPC .......... *H04L 9/3268* (2013.01); *G06F 8/61* (2013.01); *G06F 21/51* (2013.01); *H04L 9/3247* (2013.01); *G06F 2221/033* (2013.01)

(58) Field of Classification Search
CPC ................................... H04L 9/3247
See application file for complete search history.

(56) References Cited

U.S. PATENT DOCUMENTS

| 8,533,811 | B2 | 9/2013 | Bruno et al. | |
| 2005/0138422 | A1* | 6/2005 | Hancock | H04L 9/00 726/4 |
| 2005/0234825 | A1* | 10/2005 | Andersson | G06F 8/60 705/51 |
| 2006/0064488 | A1* | 3/2006 | Ebert | G06F 21/121 709/225 |
| 2006/0106728 | A1* | 5/2006 | Yellai | G06F 21/105 705/59 |
| 2007/0006320 | A1* | 1/2007 | Paul | G06F 21/57 726/27 |
| 2007/0198421 | A1* | 8/2007 | Muller | G06F 21/10 705/52 |
| 2008/0114685 | A1* | 5/2008 | Leong | G06F 21/121 705/51 |
| 2010/0275029 | A1* | 10/2010 | Little | G06F 21/62 713/176 |
| 2011/0177792 | A1 | 7/2011 | Bruno et al. | |

(Continued)

*Primary Examiner* — Jason Chiang
(74) *Attorney, Agent, or Firm* — Jefferson IP Law, LLP

(57) ABSTRACT

A method of managing application installation is provided. The method includes receiving an application by an electronic device, determining an application signature key included in the application, if the application signature key matches a development signature key among the development signature key and a commercial signature key, verifying the application signature key in relation to whether the electronic device corresponds to information on a test electronic device defined in the application signature key, and installing the application based on a verification result of the application signature key.

11 Claims, 10 Drawing Sheets

(56) References Cited

U.S. PATENT DOCUMENTS

2012/0311675 A1\* 12/2012 Ham .................. G06F 8/61
                                                                726/4
2013/0067601 A1    3/2013 Dwivedi et al.
2013/0275973 A1\* 10/2013 Greenfield .......... G06F 9/44584
                                                                718/1

\* cited by examiner

FIG.5

```
<AuthenticationRequest>                                    610
<Email>brown@gmail.com</EmailAddr>
<DeveloperType>Individual</DeveloperType>                  620
<GrantedPrivilege>Public</GrantedPrivilege>                630
<TestDeviceInfo>
<TestDevice>u2HJnw/nvFrEu21LD0znFTioPnu=</TestDevice>
</TestDeviceInfo>
</AuthenticationRequest>                                   640
```

FIG. 6

```
<AuthenticationRequest>  ──710
<Email>brown@gmail.com</EmailAddr>
<DeveloperType>Individual</DeveloperType>  ──720
<GrantedPrivilege>Public</GrantedPrivilege>  ──730
<TestDeviceInfo>  ──740
<TestDevice>u2HJnw/nvFrEu21LD0znFTioPnu=</TestDevice>
</TestDeviceInfo>
<Certificate>MIIDwDCCAqigAwIBAgIBATANBgkqhkiG9w0BAQsFADCBvDETAPBg
AKGA1UEBhMCS11x FDASBgNVBAgMC1NvdXRoIEtvcmVhMQ4wDAYDVQQHDAVTdXdvb
jEmMCQGA1UEC gwdU2Ftc3VuZyBFbGVjdHJvbmljcyBDby4sIEx0Z0C4xDzANBgNVB
AsMBk1vYmIsZTEo MCY GA1UEAwwiROVBUj IgREVWRUxPUEVSIFB1YmxpYyBDQSBD
bGFzczEkMCIGCSqGSIb3DQEJAR YVZ2VhcjIuc2VjQHNhbXN1bmcuY29tMB4XDTE0
MDQwMTAzNTQ0OFoX DTE2MDMzMTAzNTQ0 OFowbjELMAkGA1UEBhMCS11xETAPBgN
VBAgTCEd5ZW9uZ2dpMQ4wDAYDVQQHEwVTdXdvbjE OMAwGA1UEChMFVGI6ZW4xDjA
MBgNVBAsTBVRpemVu MRwwGgYDVQQDExNTdW5na3IlLWRpc 3RyaWJ1dG9yMIIBIj
ANBgkqhkiG9w0BAQEFAAOCAQ8AMIIBCgKCAQEAp644dTPQKXBfzJcT gV3pTIX+wo
CgcTAA96tx49F2tJnD eHa+AS2UfrFPMeJ/w9C8d0WgBjwNq1R+0WrVyTIowU uwb  ──750
MMOHp5Vym/CCnqbHKdtPOpHULSLzMR7nP61WwmX4KJ8+yUMPUIHEuaxA7g2zAm+tJ
fzW QvtEI/FSPnzG96m IjIWahmkzGaYz9SAv/LOyVAIKCIJ6MsKnNGcKA6aQDjq
jFVdarDc4N bqLJtvrGbOrGN6pGxYpxyGh5n5dGHCDWg1aiQ67f5VShaeAIdwNx5m
J/4IX+AmXn6YOJmBY At Mp89ZS/UwdwC2PjyNg1rG5XE8412IB1kQgU3zn8DfwID
AQABoxowGDAJBgNVHRMEAjAA MAsGA1UdDwQEAwIHgDANBgkqhkiG9w0BAQsFAAOC
AQEAFIcz+elniqx92JXj GICxP1+HIn iWO4oeIGLudEeVxpjrtXBLONDIWBCkuzB
F/0gT4ddbVTvJNnix9XWSaY0A/p65Cgc++vAXZ 6Y9tRPD5Cybn3PpNzPTSj1KP+U
kDFxI+zPIGhE/sT84EEHt 3ZjPimOj9tfSzXSX2QuS65I ZF7d3pnMmR5l3Lqw5Mn
VF7h2fejKSuch6QW8ouW2qfdH0b+IelXz2TtwOBSKnKSMyFE4Zpy IIksYpyR5zHM
TsbDLjI3VIspdGzcQvXjXz 632z1SLIEWZxH2/GH+zOCjyFy6iPfh5tI/Qu7aA==
</Certificate>
<Signature>ByR6exOPGZbGTz9Du+QTK6DMOLSe4jsFTFNo95C5TZRN+mRrtgFO7P
TOP7oCRY9JAH/mTE4WCoWBAUIMnCEpzoGXowQI J4PgRA85IKIBfITpYJ4xwVZ9ZI+
VT/AhU550U/KbkRIU+HUas3276UbAQYOHRIRP6C+5kIWnsgdOjyfGPhjdI08dDKga
o+MqBmAH2C8p5cvmadf5Ptv9PcktDIUMF545FK9bj2p2rAFGh1UcNI+82vpIEWkVx  ──760
74nZeNVvKWIEJXdvBO/sewz4mBYIZNIa7O3pimF7ots+MGhbvy4/6iwz39eH7HZhu
6zoQ9QT6vfWGJYID4tIA3A==
</Signature>
</AuthenticationRequest>
```

FIG.7

METHOD FOR APPLICATION INSTALLATION, ELECTRONIC DEVICE, AND CERTIFICATE SYSTEM

CROSS-REFERENCE TO RELATED APPLICATION(S)

This application claims the benefit under 35 U.S.C. § 119(a) of a Korean patent application filed on Apr. 7, 2014 in the Korean Intellectual Property Office and assigned Serial number 10-2014-0041525 and a Korean patent application filed on Jul. 11, 2014 in the Korean Intellectual Property Office and assigned Serial number 10-2014-0087735, the entire disclosure of each of which is hereby incorporated by reference.

TECHNICAL FIELD

The present disclosure relates to a method for managing application installation, an electronic device, and a certificate system.

BACKGROUND

In an open platform like Android, anyone can develop applications, and the developed applications are distributed freely through e-mail or web and can be operated by any terminal.

In an open platform, with no distinction between commercial environments and development environments, development applications are transmitted and installed freely. There are issues relating to software piracy, such as unauthorized use and unauthorized copy. Furthermore, even if developers with ill intentions distribute applications including malicious code or modify existing applications to include malicious code and distribute them, there is no way to prevent this.

Therefore, a need exists for a method for managing application installation, an electronic device, and a certificate system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for managing application installation, an electronic device, and a certificate system.

In accordance with an aspect of the present disclosure, a method of managing application installation is provided. The method includes receiving an application by an electronic device, determining an application signature key included in the application, if the application signature key matches a development signature key among the development signature key and a commercial signature key, verifying the application signature key in relation to whether the electronic device corresponds to information on a test electronic device defined in the application signature key, and installing the application based on a verification result of the application signature key.

In accordance with an aspect of the present disclosure, an electronic device is provided. The electronic device includes a communication interface configured to receive an application, an application certificate module configured to determine an application signature key included in the application, and to verify, if the application signature key matches a development signature key among the development signature key and a commercial signature key, the application signature key in relation to whether the electronic device corresponds to information on a test electronic device defined in the application signature key, and a processor configured to install the application based on a verification result of the application signature key.

In accordance with an aspect of the present disclosure, a certificate system is provided. The certificate system includes an operation terminal configured to request a certification for a test electronic device from a certificate server based on developer information inputted by a user and information on the test electronic device, to obtain an application signature key based on encrypted information generated as a certification result of the certificate server, and to sign a developed application with the application signature key, and the certificate server configured to perform a certification on the test electronic device based on the certification request and to generate the encrypted information including application privilege information and a unique ID of the test electronic device according the certification result.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a user interface screen for requesting certification according to various embodiments of the present disclosure.

FIG. 6 is a view illustrating a certification request transmitted from an operation terminal to a certificate server according to various embodiments of the present disclosure.

FIG. 7 is a view illustrating encrypted information generated from a certification result of a certificate server according to various embodiments of the present disclosure.

Throughout the drawings, it should be noted that like reference numbers are used to depict the same or similar elements, features, and structures.

DETAILED DESCRIPTION

Figure 1:
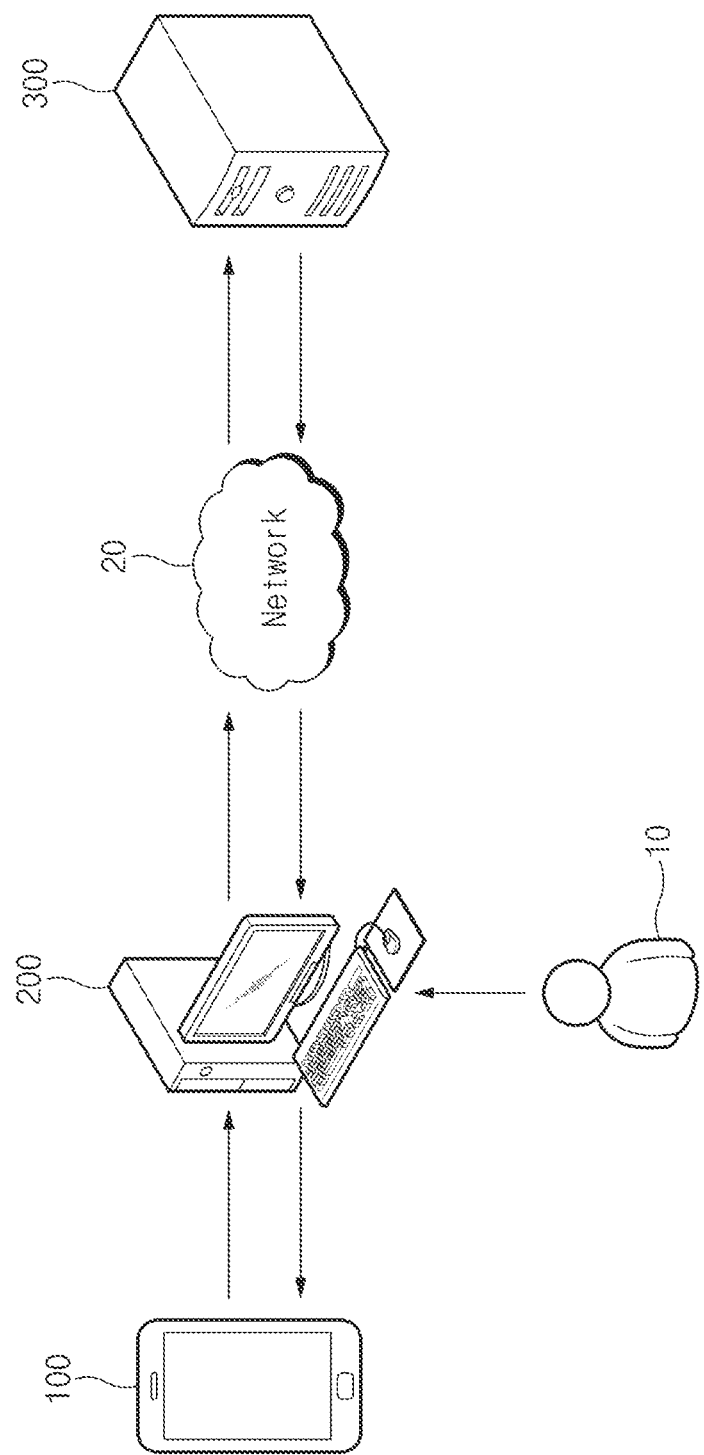
FIG. 1 is a view illustrating a certificate system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include," "comprise," and "have", or "may include," or "may comprise" and "may have" used herein indicates disclosed functions, operations, or existence of elements but does not exclude other functions, operations or elements. The meaning of "include," "comprise," "including," or "comprising," specifies a property, a region, a fixed number, a process, an element and/or a component but does not exclude other properties, regions, fixed numbers, processes, elements and/or components.

In this specification, the expression "or" includes any or all combinations of words listed. For example, "A or B" may include A or include B or include both A and B.

The terms, such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe specific embodiments, and are not intended to limit the scope of the present disclosure. The terms of a singular form may include plural forms unless they have a clearly different meaning in the context.

Unless otherwise defined herein, all the terms used herein, which include technical or scientific terms, may have the same meaning that is generally understood by a person skilled in the art. It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), Motion Picture Experts Group (MPEG-1 or MPEG-2) Audio Layer 3 (MP3) players, mobile medical devices, cameras, and wearable devices (for example, head-mounted-devices (HMDs), such as electronic glasses, an electronic apparel, electronic bracelets, electronic necklaces, electronic accessories, electronic tattoos, smart watches, and the like).

According to some embodiments, an electronic device may be smart home appliances having a communication function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, and the like), navigation devices, global positioning system (GPS) receivers, event data recorders (EDRs), flight data recorders (FDRs), vehicle infotainment devices, marine electronic equipment (for example, marine navigation systems, gyro compasses, and the like), avionics, security equipment, car head units, industrial or household robots, financial institutions' automatic teller's machines (ATMs), and stores' point of sales (POS).

According to an embodiment of the present disclosure, an electronic device may include at least one of furniture or buildings/structures having a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described with reference to the accompanying drawings. The term "user" in various embodiments may refer to a person using an electronic device or a device using an electronic device (for example, an artificial intelligent electronic device).

FIG. 1 is a view illustrating a certificate system according to various embodiments of the present disclosure.

Referring to FIG. 1, the certificate system may be configured with an electronic device 100, an operation terminal 200, and a certification server 300.

The certificate system of FIG. 1 may limit the installation of a development application through an application signature key, thereby allowing a development application to be installed to only the electronic device 100 certificated by the certification server 300. An application according to various embodiments of the present disclosure may include execution code, data referenced by the execution code, a resource for screen configuration, application authority information defining data or functions that the application accesses, an entire application signature value, an open key for certifying an application signature key, an authority open key for certifying the open key, or the device unique ID (DUID) of a test electronic device.

The electronic device 100 may be a test electronic device for testing an application that a developer 10 writes in an actual usage environment. As receiving (for example, downloading) an application, the electronic device 100 may install the application based on a verification result of an application signature key after verifying an application signature key in relation to whether a corresponding application includes the application signature key certificated by a certificate authority, whether which one of a development signature key and a commercial signature key the application signature key matches, and whether the electronic device 100 corresponds to information on a test electronic device defined in the application signature key. Applications may be divided into development applications in a development state and commercial applications certificated as commercial products by commercial authorities.

If the received application corresponds to the commercial application, the electronic device 100 may install a corresponding application. If the received application corresponds to the application for development, the electronic device 100 may verify the application signature key relating to whether the electronic device 100 corresponds to information on a test electronic device defined in the application signature key. The electronic device 100 may determine whether the electronic device 100 corresponds to a test electronic device certificated by a certificate authority based on the application signature key. For example, the electronic device 100 may verify the application signature key in relation to whether the unique ID of the electronic device 100 corresponds to the unique ID of a test electronic device defined in the application signature key. Development applications are installed to only an electronic device registered as a test electronic device in a certificate authority and the installation of development applications is limited through the certification of a certificate authority and the application signature.

According to an embodiment of the present disclosure, the electronic device 100 may verify the application signature key in relation to whether data or functions of the electronic device 100 that the application accesses are out of an application authority range defined in the application signature key. The electronic device 100 may limit the installation of development applications by using the application signature key, thereby allowing the application to access the electronic device 100 within the application authority range certificated by the certificate authority. For example, the electronic device 100 may determine the data and functions of the electronic device 100 that the application accesses and if the data and functions of the electronic device 100 that the application accesses is output of the application authority range, the electronic device 100 may not install the application.

The operation terminal 200 may request a certification for the test electronic device from a certificate authority based on developer information inputted by a user and information on the test electronic device. The developer information may include at least one of the name of the developer, an e-mail address of the developer, developer account information registered in a certificate authority, a developer type, and the like. The information on the tests electronic device may include the unique ID of the test electronic device and an application privilege level that the developer 10 requests. The application privilege level may be obtained by classifying data or functions that a test electronic device accesses according to a privilege by each stage in a test electronic device.

For example, in order to test development applications in the electronic device 100, the developer 10 may input information on the electronic device 100 corresponding to a test electronic device to the operation terminal 200 and may then request a certification for the electronic device 100 from the certificate authority.

Alternatively, in order to use data or functions necessary for development applications, the developer 10 may include an application privilege level that the developer 10 wants in a certification request on the test electronic device and may then request a certification from the certification server 300.

The operation terminal 200 may request a certification for the test electronic device from the certification server 300 of the certificate authority through e-mail or web. The operation terminal 200 may request a certification for the test electronic device by using developer information (for example, developer account information registered in a certificate authority) pre-registered in a certificate authority, or may request both a certification for the test electronic device and a certification for a developer by receiving information (for example, a developer's name, a developer's e-mail address, and a developer's address) necessary for certifying the developer from a user if requesting the certification for the developer.

For example, the operation terminal 200 may request a certification for a test electronic device from the certificate authority by transmitting developer information inputted through a webpage of the certificate server 300 and information on the test electronic device to the certificate server 300. Alternatively, based on developer information inputted by a user and information on a test electronic device, the operation terminal 200 may create a request file for requesting the certifications on the developer and the tests electronic device, and as transmitting the request file to the certificate server 300 through e-mail or web, the operation terminal 200 may request the certification for the test electronic device from the certificate authority.

The certificate server 300 may be a server of a certificate authority (CA) performing certification. The certificate server 300 may perform a certification for the test electronic device in response to the certification request. For example, the certificate server 300 may perform a certification based on a developer's application development history, developer's credit information, and missing information necessary for certification from the developer information (for example, developer information pre-registered in the certificate authority or information necessary for the developer certification) received in response to the certification request.

For example, if there is a problem with the past history of an application that the developer 10 develops, the certificate server 300 may not certify the developer 10 in response to the certification request. If performing a certification for the test electronic device, the certificate server 300 may set application authority information according to the developer 10 based on the developer information. The application authority information may define data or functions of the electronic device 100 that the developer 10 accesses by using development applications. The certificate server 300 may include the set application authority information in encrypted information generated from a result of the certification for the test electronic device.

For example, on the receipt of the certification request, the certificate server 300 may set application authority information proper for a corresponding developer based on the received developer information. Alternatively, the certificate server 300 may set the application authority information based on an application privilege level that a user requests in the certification request. For example, if the developer 10 includes a desired application privilege level in the certification request and requests a certification for the test electronic device, the certificate server 300 may determine whether to allow the application privilege level that the developer 10 requests based on the developer information and may then set application authority information proper for a corresponding developer according to the determination.

The certificate server 300 may generate encrypted information on the test electronic device according to the certification result and may then transmit the generated encrypted information to the developer 10. The encrypted information may include information obtained by encrypting an application signature key or information obtained by encrypting an application certificate for generating the application signature key.

According to various embodiments, the certificate server 300 may further perform a certification for the developer 10. For example, the certificate server 300 may generate a developer signature key for a corresponding developer or a developer certificate for generating the developer signature key based on information necessary for the certification of the developer 10.

According to an embodiment of the present disclosure, if the developer 10 requests both a certification for the test electronic device and a certification for the developer 10, the certificate server 300 may transmit a developer signature key or a developer certificate, which are generated based on a certification for the developer 10 to the developer 10, being separated from encrypted information, i.e., a certification result for the test electronic device. Alternatively, the certificate server 300 may include a developer signature key or a developer certificate, which are generated from the certification result for the developer 10, in one registration file in addition to the encrypted information, i.e., the certification result for the test electronic device, and may then transmit the one registration file to the developer 10.

For example, if the certificate server 300 certifies the test electronic device in response to the certification request, the certificate server 300 may encrypt a developer certificate for generating the developer signature key and an application certificate for generating the application signature key separately to generate a registration file including encrypted information on the developer 10 and the test electronic device and may then transmit the generated registration file to the developer 10.

The operation terminal 200 may receive the encrypted information from the certificate server 300 through developer information (for example, developer account information or a developer's e-mail address) inputted during the certification request. For example, the operation terminal 200 may receive an encrypted application signature key certified by the certificate authority or an encrypted application certificate for generating an application signature key, as the encrypted information.

According to an embodiment of the present disclosure, the operation terminal 200 may receive an encrypted application signature key from the certificate server 300, decrypt the encrypted application signature key, and obtain the application signature key.

According to an embodiment of the present disclosure, the operation terminal 200 may receive an encrypted application signature key from the certificate server 300 and may then generate the application signature key based on the encrypted application certificate.

According to an embodiment of the present disclosure, the operation terminal 200 may receive a registration file including encrypted information on a developer and a test electronic device from the authenticate server 300 and may then generate a developer signature key and an application signature key based on the registration file.

Besides that, according to various embodiments of the present disclosure, the operation terminal 200 may obtain an application signature key based on encrypted information received from the certificate server 300 and may use the obtained application signature key for the signature of development applications.

Once an application for development to be tested is written, after signing the written application with an application signature key, the developer 10 may test the written application with a test electronic device registered in the certificate authority.

As mentioned above, development applications may be installed to or executed on only a test electronic device registered in a certificate authority through the certification of the test electronic device. In terminals other than a certified test electronic device, only a commercial application distributed by a commercial authority may be installed.

Additionally, an application that does not include an application signature key or an application signature key certified by a commercial authority or a certificate authority may be limited not to be installed to or executed on an electronic device. Accordingly, development environment and commercial environment may be distinguished from each other. A certificate system according to various embodiments of the present disclosure may include a certificate server requesting a certification for a test electronic device from a certificate server based on developer information inputted by a user and information on the test electronic device, obtaining an application signature key based on encrypted information generated from a certification result of the certificate server, performing a certification for the test electronic device based on an operation terminal signing a developed application with the application signature key and the certification request, and generating application authority information and the encrypted information including and the unique ID of the test electronic device according to the certification result.

According to various embodiments of the present disclosure, the encrypted information may be information obtained by encrypting the application signature key or information obtained by encrypting an application certificate for generating the application signature key.

According to various embodiments of the present disclosure, the certificate system may include an electronic device determining an application signature key included in an application in response to the reception of the application, if the application signature key matches a development signature key among the development signature key and a commercial signature key, verifying the application signature key relating to whether the application signature key corresponds to information on a development device certified by a certificate authority, and installing the application based on a verification result of the application signature key.

According to various embodiments of the present disclosure, if the unique ID of the electronic device does not correspond to the unique ID of the test electronic device in the application signature key based on the verification result of the application signature key, the electronic device may not install the application.

According to various embodiments of the present disclosure, if data or functions of the electronic device that the application accesses do not correspond to the application authority information defined in the application signature key, the electronic device may not install the application.

According to various embodiments of the present disclosure, the certificate server may set the application authority information according to the developer based on the developer information included in the certification request.

According to various embodiments of the present disclosure, the certificate server may set the application authority information based on an application privilege level that a user requests in the certification request.

Figure 2:
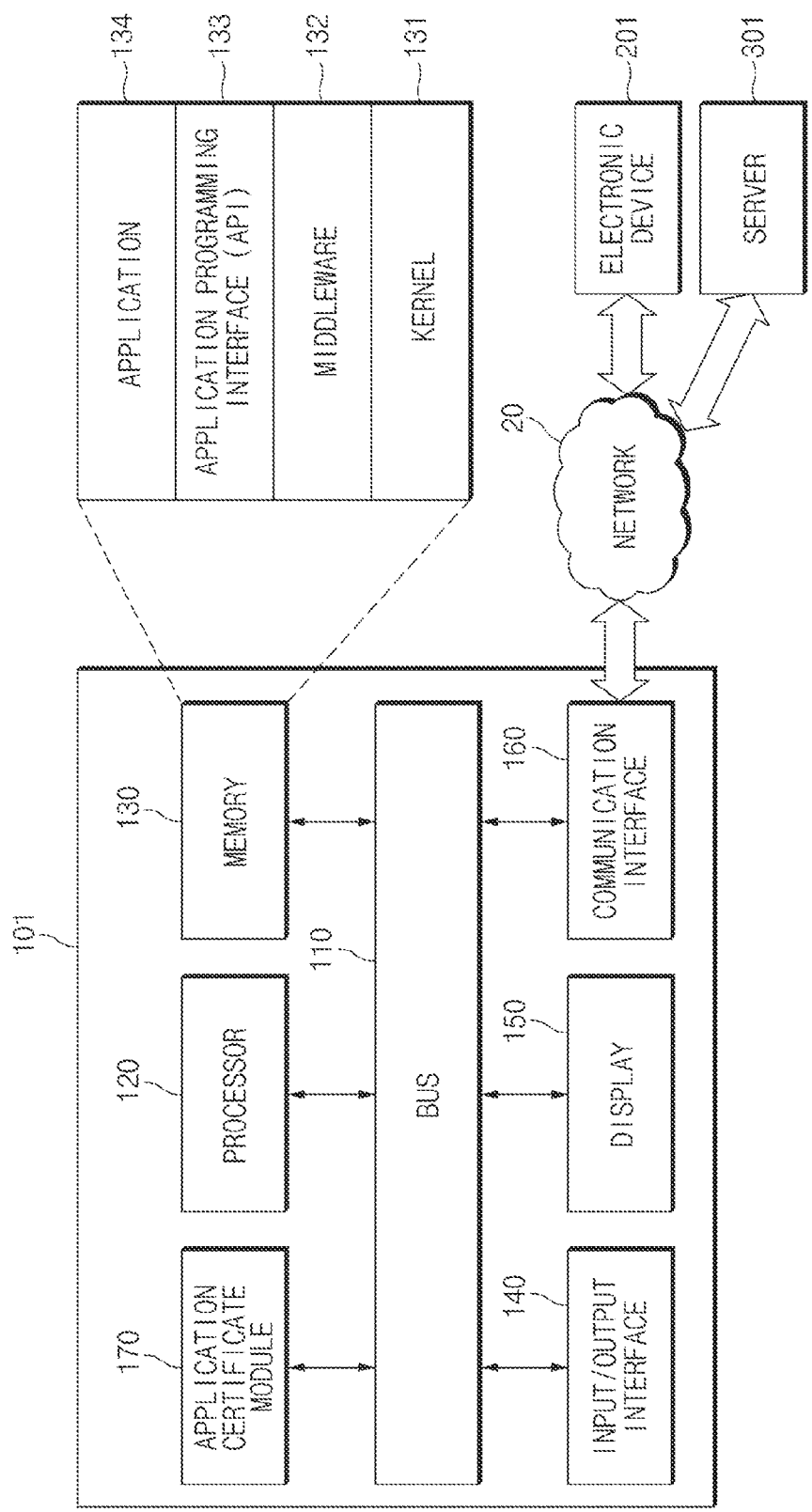
FIG. 2 is a block diagram illustrating an electronic device according to various embodiments of the present disclosure.

FIG. 2 is a block diagram illustrating a network environment including an electronic device according to various embodiments of the present disclosure.

Referring to FIG. 2, an electronic device 101 may include a bus 110, a processor 120, a memory 130, an input/output interface 140, a display 150, a communication interface 160, and an application certificate module 170.

The bus 110 may be a circuit connecting the above-mentioned components to each other and delivering a communication signal (for example, a control message) therebetween.

The processor 120, for example, receives an instruction from the above other components (for example, the memory 130, the input/output interface 140, the display 150, the communication interface 160, or the application certificate module 170) through the bus 110, interprets the received instruction, and performs operations and data processing in response to the interpreted instruction.

The processor 120 may install the application according to a verification result of an application signature key, which is generated from the application certificate module 170. For example, if the unique ID of the electronic device 101 does not correspond to the unique ID of the test electronic device 101 in the application signature key based on the verification result of the application signature key, the processor 120 may not install the application. Alternatively, if data or functions of the electronic device 101 that the application accesses are out of an application authority range defined in the application signature based on the verification result of the application signature key, the processor 120 may not install the application.

According to an embodiment of the present disclosure, if the application signature key does not correspond to one of the development signature key and the commercial signature key, the processor 120 may not install the application.

The memory 130 may store an instruction or data received from the processor 120 or other components (for example, the input/output interface 140, the display 150, the communication interface 160, or the application certificate module 170) or an instruction or data generated from the processor 120 or other components. The memory 130 may store the development signature key, the commercial signature key, and the unique ID of the electronic device 101. The memory 130, for example, may include programming modules, for example, a kernel 131, a middleware 132, an application programming interface (API) 133, and an application 134. Each of the above-mentioned programming modules may be configured with software, firmware, hardware, or a combination thereof.

The kernel 131 may control or manage system resources (for example, the bus 110, the processor 132, or the memory 133) used for performing operation or functions implemented by the remaining other programming modules, for example, the middleware 134, the API 120, or the application 130. Additionally, the kernel 131 may provide an interface for accessing an individual component of the electronic device 101 from the middleware 132, the API 133, or the application 134 and controlling or managing the individual component.

The middleware 132 may serve as an intermediary role for exchanging data between the API 133 or the application 134 and the kernel 131 through communication. Additionally, in relation to job requests received from the applications 132, the middleware 134 may perform a control (for example, scheduling or load balancing) for the job requests by using a method of assigning a priority for using a system resource (for example, the bus 101, the processor 110, or the memory 134) of the electronic device 101 to at least one application among the applications 120.

The API 133, as an interface through which the application 134 controls a function provided from the kernel 131 or the middleware 132, may include at least one interface or function (for example, an instruction) for file control, window control, image processing, or character control.

According to various embodiments, the application 134 may include an SMS/MMS application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 134 may be an application relating to information exchange between the electronic device 101 and an external electronic device (for example, another electronic device 201). The application relating to information exchange, for example, may include a notification relay application for delivering specific information to the external electronic device or a device management application for managing the external electronic device.

For example, the notification relay application may have a function for delivering to an external electronic device (for example, the other electronic device 201) notification information occurring from another application (for example, an SMS/MMS application, an e-mail application, a health care application, or an environmental information application) of the electronic device 101. Additionally or alternatively, the notification relay application 1134 may receive notification information from an external electronic device (for example, the other electronic device 201) and may then provide the received notification information to a user. The device management application, for example, may manage (for example, install, delete, or update) a function (for example, turning on/off an external electronic device (or some components) or adjusting the brightness (or resolution) of a display) for at least part of an external electronic device (for example, the electronic device 102) communicating with the other electronic device 201, an application operating in the external electronic device, or a service (for example, a call service or a message service) provided from the external electronic device.

According to various embodiments of the present disclosure, the application 134 may include an application specified according to the attribute (for example, a type of an electronic device) of the external electronic device (for example, the other electronic device 201). For example, if an external electronic device is an MP3 player, the application 134 may include an application relating to music playback. Similarly, if an external electronic device is a mobile medical device, the application 134 may include an application relating to heath care. According to an embodiment of the present disclosure, the application 134 may include at least one of an application specified to the electronic device 101 or an application received from an external electronic device (for example, a server 301 or the other electronic device 201).

The input/output interface 140 may deliver an instruction or data inputted from a user through an input/output device (for example, a sensor, a keyboard, or a touch screen), to the processor 120, the memory 130, the communication interface 160, or the application certificate module 170 through the bus 110. For example, the input/output interface 140 may provide data on a user's touch inputted through a touch screen to the processor 120. Additionally, the input/output interface 140 may output an instruction or data received from the processor 120, the memory 130, the communication interface 160, or the application certificate module 170 through the bus 1310, through the input/output device (for example, a speaker or a display). For example, the input/output interface 140 may output voice data processed through the processor 120 to a user through a speaker.

The display 150 may display various information (for example, multimedia data or text data) to a user.

The communication interface 160 may connect a communication between the electronic device 101 and an external device (for example, the other electronic device 201 or the server 301). The communication interface 160 may receive an application from an external device (for example, the other electronic device 201 or the server 301).

For example, the communication interface 160 may communicate with the external device in connection to a network 20 through wireless communication or wired communication. The wireless communication may include at least one of wireless fidelity (WiFi), Bluetooth (BT), near field communication (NFC), global positioning system (GPS), or cellular communication (for example, LTE, LTE-A, CDMA, WCDMA, UMTS, WiBro, or GSM). The wired communication may include at least one of universal serial bus (USB), high definition multimedia interface (HDMI), recommended standard 232 (RS-232), or plain old telephone service (POTS), for example.

According to an embodiment of the present disclosure, the network 20 may be telecommunications network. The telecommunications network may include at least one of computer network, internet, internet of things, or telephone network. According to an embodiment of the present disclosure, a protocol (for example, transport layer protocol, data link layer protocol, or physical layer protocol) for communication between the electronic device 101 and an external device may be supported by at least one of the application 134, the application programming interface 133, the middleware 132, the kernel 131, or the communication interface 160.

The application certificate module 170 may determine an application signature key in the application. The application signature key may be an application signature key used for the signature of a commercial application certified as a commercial application by a commercial certificate or an application signature key used for the signature of an application being developed to be tested in a test electronic device certified by a certificate authority.

The application certificate module 170 may determine whether the application includes an application signature key certified by a commercial authority or a certificate authority or which one of a development signature key and a commercial signature key the application signature key matches.

If the application signature key does not match one of the development signature key and the commercial signature key, the processor 120 may not install the application to the electronic device 101.

If the application signature key matches the commercial signature key, the processor 120 may install the application to the electronic device 101.

If the application signature key matches the development signature key, the application certificate module 170 may verify the application signature key in relation to whether the electronic device 101 corresponds to information on a test electronic device defined in the application signature key. If the electronic device 101 corresponds to the information on the test electronic device defined in the application signature key, the processor 120 may install the application to the electronic device 101.

For example, based on whether the unique ID of the electronic device 101 corresponds to the unique ID of the test electronic device in the application signature key, the application certificate module 170 may determine whether the electronic device 101 corresponds to the information on the test electronic device defined in the application signature key.

Alternatively, based on whether data or functions of the electronic device 101 that the application accesses are out of an application authority range defined in the application signature key, the application certificate module 170 may determine whether the electronic device 101 corresponds to the information on the test electronic device defined in the application signature key. The data or functions of the electronic device 101 that the application accesses may be determined by the application certificate module 170.

According to an embodiment of the present disclosure, the application certificate module 170 may further identify a certificate authority of the application signature key. The application certificate module 170 may determine which one of a development signature key of an identified certificate authority and a commercial signature key the application signature key matches.

The application certificate module 170 may process at least part of information obtained from other components (for example, the processor 120, the memory 130, the input/output interface 140, or the communication interface 1360) and may output the part of the information to a user through various methods. For example, the application certificate module 170 may control at least part of functions of the electronic device 101 to allow the electronic device 101 to interoperate with another electronic device (for example, the other electronic device 201 or the server 101) by using the processor 120 or separately. According to an embodiment of the present disclosure, at least one component of the application certificate module 170 may be included in the server 301 and may support at least one operation implemented in the application certificate module 170 from the server 301.

According to various embodiments of the present disclosure, the electronic device 101 may include a communication interface 160 receiving an application, an application certificate module 170 determining an application signature key from the application and if the application signature key matches a development signature key among the development signature key and a commercial signature key, verifying the application signature key in relation to whether the electronic device 101 corresponds to information on a test electronic device defined in the application signature key, and a processor 120 installing the application based on a verification result of the application signature key.

According to various embodiments of the present disclosure, the electronic device 101 may further includes a memory 101 storing the development signature key, the commercial signature key, and the unique ID of the electronic device 101.

According to various embodiments of the present disclosure, the application signature key may include application authority information encrypted by a certificate authority and the unique ID of a test electronic device.

According to various embodiments of the present disclosure, the application signature key may further include at least one of application information encrypted by a certificate authority and an expiration date.

According to various embodiments of the present disclosure, the application certificate module 170 may verify the application signature key in relation to whether the unique ID of the electronic device 101 corresponds to the unique ID of the test electronic device in the application signature key. If the unique ID of the electronic device 101 does not correspond to the unique ID of the test electronic device in the application signature key, the processor 120 may not install the application.

According to various embodiments of the present disclosure, the application certificate module 170 may verify the application signature key in relation to whether data or functions of the electronic device 101 that the application accesses are out of an application authority range defined in the application signature key. If data or functions of the electronic device 101 that the application accesses are out of an application authority range defined in the application signature, the processor 120 may not install the application.

According to various embodiments of the present disclosure, if the application signature key matches the commercial signature key, the processor 120 may install the application to the electronic device 101.

According to various embodiments of the present disclosure, if the application signature key does not match one of the development signature key and the commercial signature key, the processor 120 may not install the application to the electronic device 101.

According to various embodiments of the present disclosure, the application certificate module 170 identify the certificate authority of the application signature key and may then determine which one of the development signature key of the identified certificate authority and the commercial signature key the application signature key matches.

Figure 3:
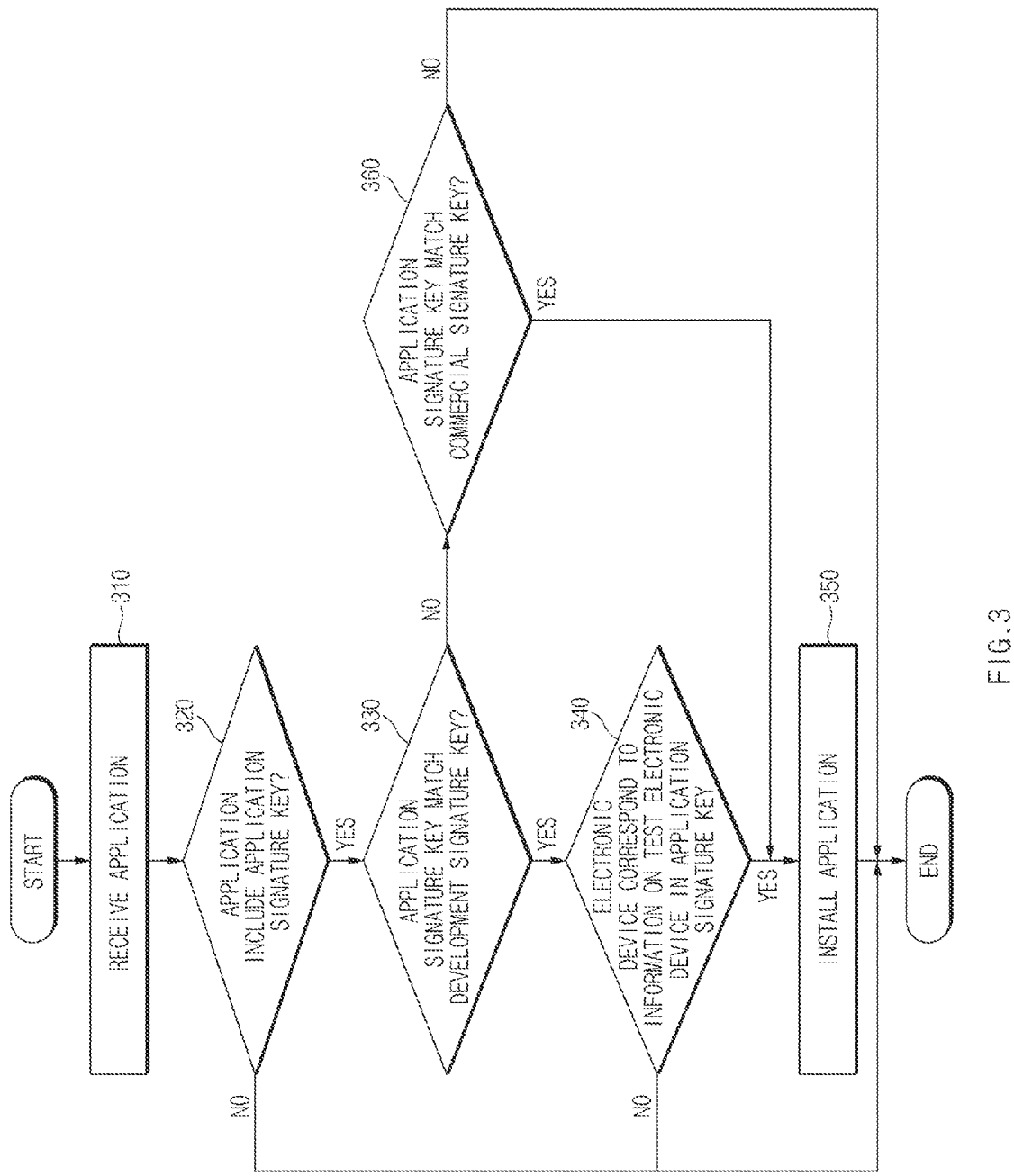
FIG. 3 is a flowchart illustrating a method of managing application installation in an electronic device according to various embodiments of the present disclosure.

FIG. 3 is a flowchart illustrating a method of managing application installation in an electronic device according to various embodiments of the present disclosure.

The flowchart shown in FIG. 3 may be configured with operations processed in the electronic device shown in FIGS. 1 and 2. Accordingly, even omitted contents, which are described for the electronic device shown in FIG. 1, may be applied to the flowchart of FIG. 3.

Referring to FIG. 3, in operation 310, the communication interface 160 receives application.

In operation 320, the application certificate module 170 determines whether the application includes an application signature key. According to an embodiment of the present disclosure, the application signature key may include application authority information encrypted by a certificate authority and the unique ID of a test electronic device. According to another embodiment of the present disclosure, the application signature key may further include at least one of application information encrypted by a certificate authority and an expiration date.

If the application includes the application signature key, the application certificate module 170 may perform operation 330. If the application does not include the application signature key, the processor 120 may terminate a process for application installation without installing the application.

In operation 330, the application certificate module 170 determines whether the application signature key matches a development signature key.

If the application signature key matches the development signature key, the processor 120 may perform operation 350. If the application signature key does not match the development signature key, the application certificate module 170 may perform operation 360.

In operation 340, the application certificate module 170 verifies the application signature key in relation to whether the electronic device 100 receiving the application corresponds to information on a test electronic device defined in the application signature key.

For example, based on whether the unique ID of the electronic device 100 corresponds to the unique ID of the test electronic device in the application signature key, the application certificate module 170 may verify whether the electronic device 100 corresponds to the information on the test electronic device defined in the application signature key.

Alternatively, based on whether data or functions of the electronic device 100 that the application accesses are out of an application authority range defined in the application signature key, the application certificate module 170 may verify whether the electronic device 100 corresponds to the information on the test electronic device defined in the application signature key.

If the electronic device 100 corresponds to the information on the test electronic device defined in the application signature key, the processor 120 may perform operation 350. If the electronic device 100 does not correspond to the information on the test electronic device defined in the application signature key, the processor 120 may not install the application to the electronic device 100 and may then terminate a process for the application installation.

In operation 350, the processor 120 installs the application to the electronic device 100.

In operation 360, the application certificate module 170 determines whether the application signature key matches a commercial signature key.

If the application signature key matches the commercial signature key, the processor 120 may perform operation 350. If the application signature key does not match the commercial signature key, the processor 120 may terminate a process for application installation without installing the application.

According to various embodiments of the present disclosure, a method of managing application installation includes receiving an application in the electronic device 100, determining an application signature key in the application, if the application signature key matches a development signature key among the development signature key and a commercial signature key, verifying the application signature key in relation to whether the electronic device 100 corresponds to information on a test electronic device defined in the application signature key, and installing the application based on a verification result of the application signature key.

According to various embodiments of the present disclosure, the verifying of the application signature key may include verifying the application signature key in relation to whether the unique ID of the electronic device 100 corresponds to the unique ID of the test electronic device in the application signature key.

According to various embodiments of the present disclosure, the installing of the application may include if the unique ID of the electronic device 100 does not correspond to the unique ID of the test electronic device in the application signature key, not installing the application.

According to various embodiments of the present disclosure, the verifying of the application signature key includes determining data or functions of an electronic device and verifying the application signature key in relation to whether the data or functions of the electronic device that the application accesses are out of an application authority range defined in the application signature key based on the determined result.

According to various embodiments of the present disclosure, if the data or functions of the electronic device 100 that the application accesses are out of the application authority range defined in the application signature, the installing of the application includes not installing the application.

According to various embodiments of the present disclosure, the application signature key may include application authority information encrypted by a certificate authority and the unique ID of a test electronic device.

Alternatively, the application signature key may further include at least one of application information encrypted by a certificate authority and an expiration date.

According to various embodiments of the present disclosure, the unique ID of the test electronic device may be at least one of an embedded multimedia card (emmc) ID, an international mobile station equipment identity (IMEI), a MAC address, and the like.

According to various embodiments of the present disclosure, the method of managing application installation may include, if the application signature key matches the commercial signature key, installing the application to the electronic device 100.

According to various embodiments of the present disclosure, if the application signature key does not match one of the development signature key and the commercial signature key, the application may not be installed to the electronic device.

Figure 4:
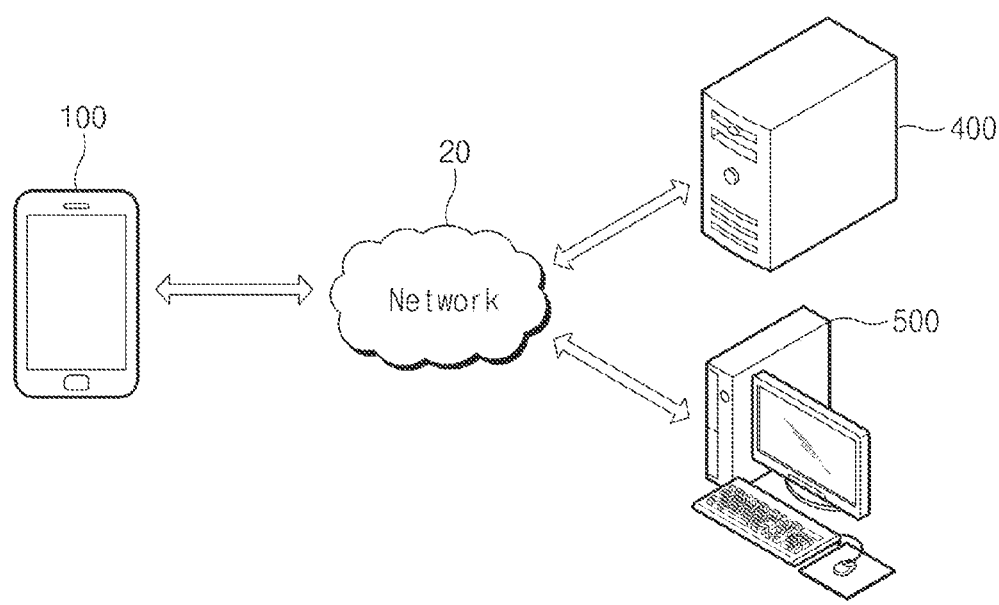
FIG. 4 is a view illustrating an application development environment and an application commercial environment according to various embodiments of the present disclosure.

FIG. 4 is a view illustrating an application development environment and an application commercial environment according to various embodiments of the present disclosure.

Referring to FIG. 4, an electronic device 100 may receive an application through a network 20. The electronic device 100 may receive an application through a commercial server 400 of a commercial authority or may receive an application through another electronic device 500.

The electronic device 100 may verify whether the received application is an application certified by a certificate authority and may install the application based on a verification result.

The electronic device 100 determines whether there is an application signature key in the application and if there is the application signature key, determines which one of a development signature key and a commercial signature key the application signature key matches. Applications may be divided into development applications in a development state and commercial applications certified as commercial products by commercial authorities. The application signature key may be an application signature key used for the verification of a commercial application by a commercial authority or an application signature key used for the signature of an application being developed to be tested in a test electronic device certified by a certificate authority.

If the application signature key matches the development signature key, the electronic device 100 may verify the application signature key in relation to whether the electronic device 100 corresponds to information on a test electronic device defined in the application signature key.

If the received application matches a commercial application, that is, if the application signature key matches the commercial signature key, the electronic device 100 may install the application to the electronic device 100. However, if the received application matches a development application, that is, if the application signature key matches the development signature key, the electronic device 100 may verify whether the electronic device 100 corresponds to information on a test electronic device verified by a certificate authority.

A development application may be limited through the certification and signature of a certificate authority to be installed to and executed on only an electronic device certified as a test electronic device by the certificate authority. Accordingly, a development application may be installed to only a test electronic device certified by a certificate authority.

Figure 5:
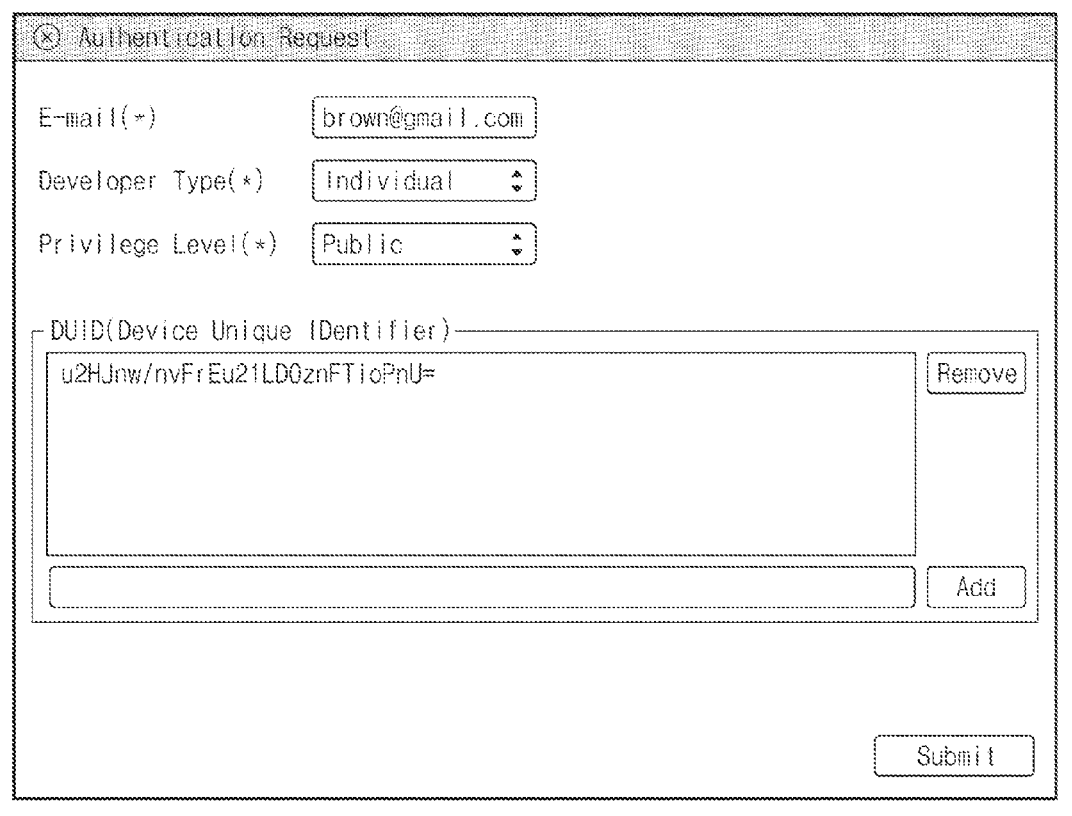

FIG. 5 is a user interface screen for requesting certification according to various embodiments of the present disclosure.

Referring to FIG. 5, according to an embodiment of the present disclosure, the operation terminal 200 may receive a user input on developer information and information on a test electronic device from a user through a user interface screen shown in FIG. 5. For example, the user interface screen may be a webpage provided by the certificate server 300. Alternatively, the user interface screen may be provided by a program installed to the operation terminal 200, for example, a software development kit (SDK) used for developing application.

For example, based on a user input inputted through the user interface, the operation terminal 200 may create a request file (for example, an XML file) for requesting the certifications on the test electronic device and may then transmit the request file to the certificate server 300 through e-mail or web, so that the operation terminal 200 may request the certification on the test electronic device from the certificate authority.

According to an embodiment of the present disclosure, the user interface screen may include contents for requesting a user input on developer account information, a privilege level, and the unique ID of a test electronic device. At this point, the developer account information may be pre-registered in the certificate server 300.

According to various embodiments of the present disclosure, the user interface screen may further receive a user input on additional developer information, for example, a developer type, that is, whether a developer is an individual or a company.

Alternatively, according to various embodiments of the present disclosure, the user interface screen may further receive a user input on the name of a development application, application information, and a certification expiration date. For example, the certificate server 300 may further include information (for example, an application name, application information, and certification expiration date) on an application in a user interface screen for certification request, so that the certificate server 300 may limit the usage of a development application through an application name, application information, and a certification expiration date.

After inputting developer information, such as developer account information and a developer type and information on a test electronic device, such as an application privilege level and the unique ID of a test electronic device into the user interface screen, a user may press a submit button for certification request. In response to this, the operation terminal 200 may transmit to the certificate server 300 a certification request including the developer information inputted by the user and the information on the test electronic device. The operation terminal 200 may transmit a certification request shown in FIG. 7 to the certificate server 300.

The operation terminal 200 may request a certification for the test electronic device by using developer account information pre-registered in the certificate server 300 but the operation terminal 200 may further receive information (for example, the name of a developer, an e-mail address of a developer, an address of a developer, and a certification password) necessary for the certification of a developer from a user during the certification request and may then request both a certification for the test electronic device and a certification for a developer.

FIG. 6 is a view illustrating a certification request transmitted from an operation terminal to a certificate server according to various embodiments of the present disclosure.

Referring to FIG. 6, the certification request may include developer information and information on a test electronic device. For example, the developer information may be developer information pre-registered in a certificate authority (for example, developer account information registered in a certificate authority). According to various embodiments of the present disclosure, the developer information may further include a developer type, that is, whether a developer is an individual or a company.

If a certification for the test electronic device and a certification for the developer are requested at the same time, the developer information may further include information (for example, the name of a developer, an e-mail address of a developer, and an address of a developer) necessary for the certification of the developer. The information on the tests electronic device may include the unique ID of the test electronic device and an application privilege level that the developer 10 requests.

Referring to FIG. 6, the certification request may include developer information received through a user interface screen. The certification request shown in FIG. 6 includes developer account information pre-registered in a certificate authority, that is, a text 610, as developer information. Additionally, the certification request may further include a developer type inputted through a user interface screen as shown in a text 620. According to the text 620, the developer type requesting certification may be an individual. According to various embodiments of the present disclosure, the developer information may further include the name of a developer, an e-mail address of a developer, and an address of a developer besides developer account information.

Referring to FIG. 6, the certification request may further include information on a test electronic device received through a user interface screen. The certification request shown in FIG. 6 includes an application privilege level as information on a test electronic device, for example, a text 630.

The application privilege level may be obtained by classifying data or functions that an application accesses according to a privilege by each stage in a test electronic device. For example, the application privilege level may be set according to a security level of data or functions that an application accesses.

For example, an application with the lowest application privilege level may access data of a low security level, for example, media data, such as video and music or data stored in an external memory. Hereinafter, for convenience of description, the lowest application privilege level is referred to as public. An application having a one-step higher privilege level than the public may access data or functions relating to personal information of a user of an electronic device in addition to the low security level data. For example, an application having the privilege level may access a call log, GPS information, and SMS message. An application having the highest privilege level may change a setting of a system or a platform in addition to the data or functions relating to personal information of a user of an electronic device. An application privilege level divided into three stages according to such a security level is just one embodiment and according to various criteria, may set an application privilege level for limiting data or functions that an application accesses in a test electronic device according to various stages.

According to the text 630 of FIG. 6, a developer requesting the certification may request an application privilege level corresponding to public. Additionally, the certification request may include the unique ID of a test electronic device as shown in a text 640. The unique ID of the test electronic device may include an emmc ID, an international mobile station equipment identity (IMEI), a MAC address as a device unique ID (DUID) identifying an electronic device, and the like.

Besides that, a request file may further include application information on a development application or an expiration date. According to various embodiments of the present disclosure, a developer may further include information (for example, the name of a developer, an e-mail address of a developer, an address of a developer, and a certification password) necessary for the certification of the developer in response to the certification request and may request both the certification for the test electronic device and the certification for the developer.

FIG. 7 is a view illustrating encrypted information generated from a certification result of a certificate server according to various embodiments of the present disclosure.

The certificate server 300 may perform a certification on the test electronic device based on the received certification request and may then transmit the encrypted information to a developer according to a certification result.

The encrypted information may include information obtained by encrypting an application signature key or information obtained by encrypting an application certificate for generating the application signature key. For example, the certificate server 300 may encrypt information on the test electronic device by using a token recognized by the electronic device 100, an electronic signature, and a previously exchanged secrete key.

Referring to FIG. 7, the encrypted information may include developer information identical to developer information included in a certification request. The encrypted information shown in FIG. 7 may include developer account information (for example, a text 710) and a developer type (for example, a text 720) that respectively correspond to the text 610 and the text 620 included in the certification request of FIG. 6, as developer information.

Additionally, the encrypted information may include information identical to information on a test electronic device in a certification request. The encrypted information shown in FIG. 7 may include an application privilege level (for example, a text 730) and the unique ID (for example, a text 740) of a test electronic device that respectively correspond to the text 630 and the text 640 included in the certification request of FIG. 6, as information on a test electronic device. The text 740 corresponds to the unique ID of a test electronic device identical to the text 640 that is the unique ID of a test electronic device included in the certification request.

The encrypted information may include certification information relating to the test electronic device as shown in the text 750. The text 750 is a value generated from a certificate authority, as a certification result of a certificate authority, based on a certification request. For example, the text 750 may be an application signature key obtained by encrypting an application signature key. Alternatively, the text 750 may be an encrypted application certificate for generating the application signature key. At this point, the encrypted information certificate may be generated from a certificate authority based on information on a test electronic device included in a certification request. For example, the information on the test electronic device may be a key paired with the RSA key of the application certificate.

The encrypted information is generated based on the certification request that the certificate server 300 receives and besides the listed developer information and information on the test electronic device, the encrypted information may further include another information included in the certification request. For example, if a request file further includes application information on development application or an expiration date, the encrypted information may further include application information or an expiration date. The encrypted information may include a signature value on the entire encrypted information as shown in a text 760. The text 760 is used for preventing the change or theft of the encrypted information and is a signature value that is newly generated by a certificate authority in order to encrypt the entire encrypted information.

According to various embodiments of the present disclosure, if the certificate authority receives a request of a certification for the test electronic device and a certification for a developer, the encrypted information may further include developer certification information encrypted by a certificate authority. For example, the developer certification information may be a developer signature key obtained by encrypting a developer signature key or an encrypted developer certificate for generating the developer signature key. At this point, the encrypted developer certificate may be generated from a certificate authority based on information on a developer included in the certification request. For example, the information on the developer may be a key paired with the RSA key of the developer certificate.

The encrypted information generated from the certificate server 300 of a certificate authority may be transmitted to the developer through e-mail, web, and another electronic device. For example, the certificate server 300 may transmit the encrypted information to the developer through a developer account included in the certification request.

According to various embodiments of the present disclosure, the certificate server 300 may include the developer certification information generated based on a certification result for the developer and the encrypted information that is a certification result of the test electronic device in one registration file and may then transmit the registration file to the developer 10.

However, the present disclosure is not limited thereto. The certificate server 300 may transmit developer certification information (for example, a developer signature key or a developer certificate) generated from a certification result for the developer 10 to the developer 10 separately from encrypted information that is a certification result for the test electronic device.

The operation terminal 200 may obtain an application signature key for signing an application based on encrypted information received from the certificate server 200. For example, the operation terminal 200 may receive an encrypted application signature key from the certificate server 300, decrypt the encrypted application signature key, and obtain the application signature key. Alternatively, the operation terminal 200 may receive an encrypted application signature key from the certificate server 300 and may then generate the application signature key based on the encrypted application certificate.

For example, the operation terminal 200 may generate the application signature key based on the application certificate in the received encrypted information and information on a test electronic device in the certification result. For example, the information on the test electronic device may be a key paired with the RSA key of the application certificate. For example, the operation terminal 200 may generate an application signature key based on the encrypted information in a software development kit (SDK) and may sign a development application written by the SDK as the application signature key.

Figure 8:
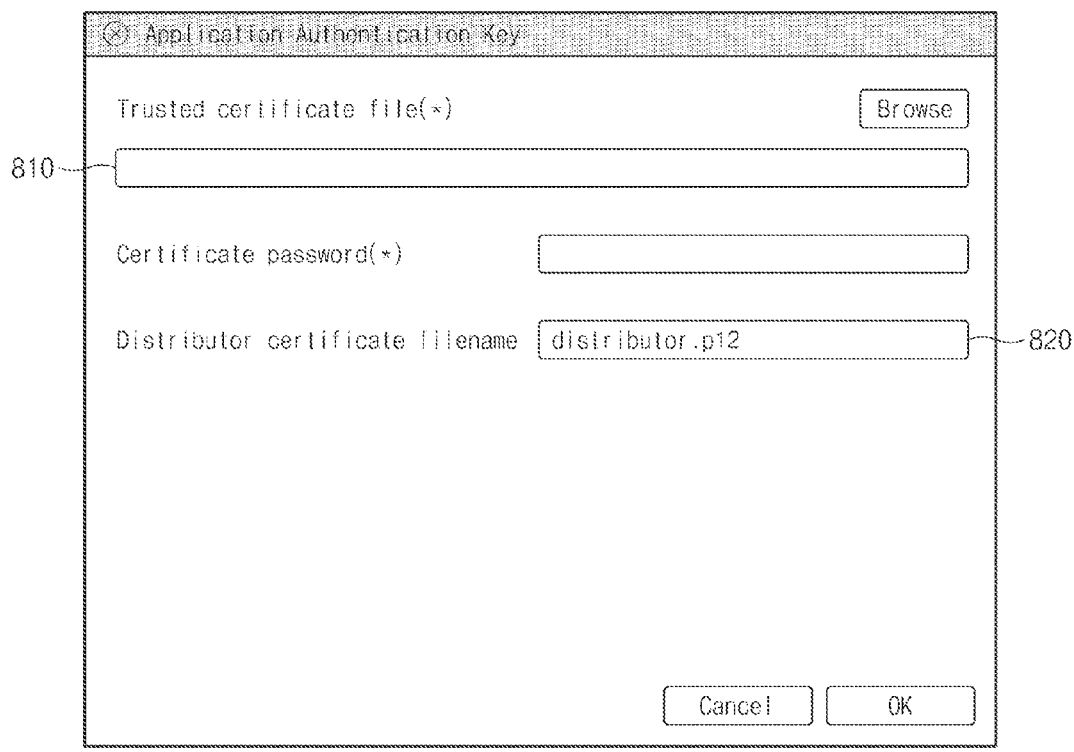
FIG. 8 is a view illustrating a task for generating an application signature key based on an encrypted application certificate received as a certification result of a certificate server according to various embodiments of the present disclosure.

FIG. 8 is a view illustrating a task for generating an application signature key based on an encrypted application certificate received as a certification result of a certificate server according to various embodiments of the present disclosure.

If an encrypted application certificate is received as a certification result of the certificate server 300, the operation terminal 200 may generate an application signature key based on the application certificate. A developer may generate an application signature key from an application certificate through a user interface screen as shown in FIG. 8.

However, the user interface screen is not limited to FIG. 8 and an application signature key may be generated through various user interface screens.

The operation terminal 200 may receive an encrypted application certificate as a certification result for certification request from the certificate server 300. The operation terminal 200 may receive the encrypted application certificate from the certificate server 300 through e-mail, web, and another electronic device. The received encrypted application certificate may be stored in a memory of the operation terminal 200.

The operation terminal 200 may generate an application signature key based on an encrypted application certificate received from the certificate server 300. According to an embodiment of the present disclosure, the operation terminal 200 may generate an application signature key based on information on a test electronic device in the certification request and an encrypted application certificate received from the certificate server 300. For example, the information on the test electronic device may be a key paired with the RSA key of the application certificate.

Referring to FIG. 8, a user presses a browse button displayed at the right of the user interface screen and loads an encrypted application certificate 810 received from the certificate server 300. Accordingly, the loaded encrypted application certificate 810 may be displayed on the user interface screen. A user may input a certificate password to the user interface screen and may then input the name of an application signature key to be generated. For example, as shown in FIG. 8, a user may input the name of an application signature key 820 to be generated. Accordingly, an application signature key having the name of 'distributor.p12' may be created.

According to various embodiments of the present disclosure, if a certification for the test electronic device and a certification for a developer are requested, the operation terminal 200 may receive one registration file including an encrypted application certificate and an encrypted developer certificate as a certification result from the certificate server 300. A user loads a registration file received from the certificate server 300 into a user interface screen and inputs a certificate password into the user interface screen, so that an application signature key and a developer signature key may be generated in the operation terminal 200 respectively from the encrypted application certificate and the encrypted developer certificate included in the registration file.

The operation terminal 200 may sign a development application with such an application signature key that is generated above. According to an embodiment of the present disclosure, if a development application is written in an SDK, a user may load the application signature key from the SDK and may then sign the development application with the application signature key. Thereby, an application including an application signature key may be generated.

If an application including an application signature key is transmitted to the electronic device 100, the electronic device 100 may verify whether the application includes an application signature key, whether the application signature key matches a development signature key or a commercial signature key, and if the application signature key corresponds to the development signature key, whether the electronic device 100 corresponds to information on a test electronic device.

Figure 9:
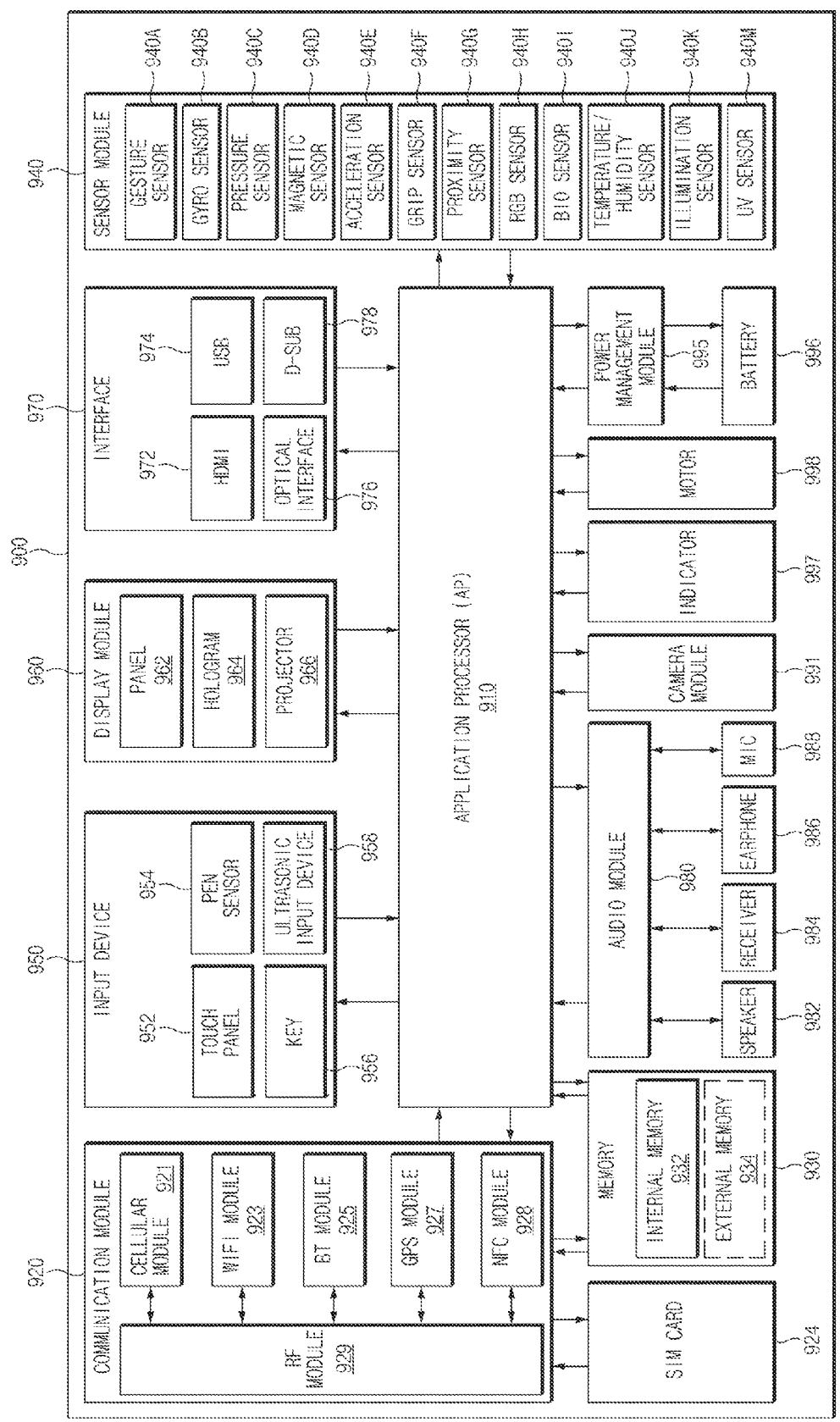
FIG. 9 is a block diagram illustrating an electronic device according to various embodiments of the present disclosure.

FIG. 9 is a block diagram illustrating an electronic device according to various embodiments of the present disclosure.

An electronic device 901, for example, may configure all or part of the above-mentioned electronic device 101 shown in FIG. 1.

Referring to FIG. 9, the electronic device 901 includes at least one application processor (AP) 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may control a plurality of hardware or software components connected to the AP 910 and also may perform various data processing and operations with multimedia data by executing an operating system or an application program. The AP 910 may be implemented with a system on chip (SoC), for example. According to an embodiment of the present disclosure, the processor 910 may further include a graphical processing unit (GPU) (not shown). According to another embodiment of the present disclosure, the AP 910 may further include a certificate module (not shown).

The certificate module determines whether there is an application signature key in the application received through the communication module 920 and if there is the application signature key, determines which one of a development signature key and a commercial signature key the application signature key matches. If the application signature key matches the development signature key, the certificate module determines whether the electronic device corresponds to a test electronic device of the application signature key. Based on a verification result for the received application of the certificate module, if the application signature key corresponds to the commercial signature key, or if the application signature key corresponds to the development signature key and the electronic device 901 corresponds to a test electronic device in the application signature key, the AP 910 installs the application.

The communication module 920 (for example, the communication interface 160) may perform data transmission through a communication between other electronic devices (for example, the other electronic device 201 or the server 301) connected to the electronic device 901 (for example, the electronic devices 101) through a network. According to an embodiment of the present disclosure, the communication module 920 may include a cellular module 921, a Wifi module 923, a BT module 925, a GPS module 927, an NFC module 928, and a radio frequency (RF) module 929.

The cellular module 921 may provide voice calls, video calls, text services, or internet services through a communication network (for example, LTE, LTE-A, CDMA, WCDMA, UMTS, WiBro, or GSM). The cellular module 921 may perform a distinction and authentication operation on an electronic device in a communication network by using a subscriber identification module (for example, the SIM card 924), for example. According to an embodiment of the present disclosure, the cellular module 921 may perform at least part of a function that the AP 910 provides. For example, the cellular module 921 may perform at least part of a multimedia control function.

According to an embodiment of the present disclosure, the cellular module 921 may further include a communication processor (CP). Additionally, the cellular module 921 may be implemented with SoC, for example. As shown in FIG. 9, components, such as the cellular module 921 (for example, a CP), the memory 930, or the power management module 995 are separated from the AP 910, but according to an embodiment of the present disclosure, the AP 910 may be implemented including some of the above-mentioned components (for example, the cellular module 921).

According to an embodiment of the present disclosure, the AP 910 or the cellular module 921 (for example, a CP) may load instructions or data, which are received from a nonvolatile memory or at least one of other components connected thereto, into a volatile memory and then may process them. Furthermore, the AP 910 or the cellular module 921 may store data received from or generated by at least one of other components in a nonvolatile memory.

Each of the Wifi module 923, the BT module 925, the GPS module 927, and the NFC module 928 may include a processor for processing data transmitted/received through a corresponding module. Although the cellular module 921, the Wifi module 923, the BT module 925, the GPS module 927, and the NFC module 928 are shown as separate blocks in FIG. 9, according to an embodiment of the present disclosure, some (for example, at least two) of the cellular module 921, the Wifi module 923, the BT module 925, the GPS module 927, and the NFC module 928 may be included in one integrated chip (IC) or an IC package. For example, at least some (for example, a CP corresponding to the cellular module 921 and a Wifi processor corresponding to the Wifi module 923) of the cellular module 925, the Wifi module 927, the BT module 928, the GPS module 921, and the NFC module 923 may be implemented with one SoC.

The RF module 929 may be responsible for data transmission, for example, the transmission of an RF signal. Although not shown in the drawings, the RF module 929 may include a transceiver, a power amp module (PAM), a frequency filter, or a low noise amplifier (LNA). Additionally, the RF module 929 may further include components for transmitting/receiving electromagnetic waves on a free space in a wireless communication, for example, conductors or conducting wires. Although the cellular module 921, the Wifi module 923, the BT module 925, the GPS module 927, and the NFC module 928 share one RF module 929 shown in FIG. 9, according to an embodiment of the present disclosure, at least one of the cellular module 921, the Wifi module 923, the BT module 925, the GPS module 927, and the NFC module 928 may perform the transmission of an RF signal through an additional RF module.

The SIM card 924 may be a card including a subscriber identification module and may be inserted into a slot formed at a specific position of an electronic device. The SIM card 924 may include unique identification information (for example, an integrated circuit card identifier (ICCID)) or subscriber information (for example, an international mobile subscriber identity (IMSI)).

The memory 930 (for example, the memory 130) may include an internal memory 932 or an external memory 934. The internal memory 932 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 932 may be a Solid State Drive (SSD). The external memory 934 may further include a flash drive, for example, compact flash (CF), secure digital (SD), micro secure digital (Micro-SD), mini secure digital (Mini-SD), extreme digital (xD), or a memorystick. The external memory 934 may be functionally connected to the electronic device 901 through various interfaces. According to an embodiment of the present disclosure, the electronic device 901 may further include a storage device (or a storage medium), such as a hard drive.

The sensor module 940 measures physical quantities or detects an operating state of the electronic device 901, thereby converting the measured or detected information into electrical signals. The sensor module 940 may include at least one of a gesture sensor 940A, a gyro sensor 940B, a pressure sensor 940C, a magnetic sensor 940D, an acceleration sensor 940E, a grip sensor 940F, a proximity sensor 940G, a color sensor 940H (for example, a red, green, blue (RGB) sensor), a bio sensor 940I, a temperature/humidity sensor 940J, an illumination sensor 940K, and an ultra violet (UV) sensor 940M. Additionally/alternately, the sensor module 940 may include an E-nose sensor (not shown), an electromyography (EMG) sensor, an electroencephalogram (EEG) sensor (not shown), an electrocardiogram (ECG) sensor (not shown), an infra-red (IR) sensor (not shown), an iris sensor (not shown), or a fingerprint sensor (not shown). The sensor module 940 may further include a control circuit for controlling at least one sensor therein.

The input module 950 may include a touch panel 952, a (digital) pen sensor 954, a key 956, or an ultrasonic input device 958. The touch panel 952 may recognize a touch input through at least one of capacitive, resistive, infrared, or ultrasonic methods, for example. Additionally, the touch panel 952 may further include a control circuit. In the case of the capacitive method, both direct touch and proximity recognition are possible. The touch panel 952 may further include a tactile layer. In this case, the touch panel 952 may provide a tactile response to a user.

The (digital) pen sensor 954 may be implemented through a method similar or identical to that of receiving a user's touch input or an additional sheet for recognition. The key 956 may include a physical button, a touch key, an optical key, or a keypad, for example. The ultrasonic input device 958, as a device determining data by detecting sound waves through a microphone (for example, a mic 988) in the electronic device 901, may provide wireless recognition through an input tool generating ultrasonic signals. According to an embodiment of the present disclosure, the electronic device 901 may receive a user input from an external device (for example, a computer or a server) connected to the electronic device 901 through the communication module 920.

The display 960 (for example, the display 150) may include a panel 962, a hologram device 964, or a projector 966. The panel 962, for example, may include a liquid-crystal display (LCD) or an active-matrix organic light-emitting diode (AM-OLED). The panel 962 may be implemented to be flexible, transparent, or wearable, for example. The panel 962 and the touch panel 952 may be configured with one module. The hologram 964 may show three-dimensional images in the air by using the interference of light. The projector 966 may display an image by projecting light on a screen. The screen, for example, may be placed inside or outside the electronic device 901. According to an embodiment of the present disclosure, the display 960 may further include a control circuit for controlling the panel 962, the hologram device 964, or the projector 966.

The interface 970 may include a high-definition multimedia interface (HDMI) 972, a universal serial bus (USB) 974, an optical interface 976, or a D-subminiature (sub) 978, for example. The interface 970 may be included in the communication interface 160 shown in FIG. 1, for example. Additionally/alternatively, the interface 970 may include a mobile high-definition link (MHL) interface, a secure Digital (SD) card/multi-media card (MMC) interface, or an infrared data association (IrDA) standard interface.

The audio module 980 may convert sound and electrical signals in both directions. At least some components of the audio module 980 may be included in the input/output interface 140 shown in FIG. 1, for example. The audio module 980 may process sound information inputted/outputted through a speaker 982, a receiver 984, an earphone 986, or the mic 988.

The camera module 991, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 995 may manage the power of the electronic device 901. Although not shown in the drawings, the power management module 995 may include a power management integrated circuit (PMIC), a charger integrated circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit, such as a coil loop, a resonant circuit, a rectifier circuit, and the like, may be added.

The battery gauge may measure the remaining amount of the battery 996, or a voltage, current, or temperature of the battery 396 during charging. The battery 996 may store or generate electricity and may supply power to the electronic device 901 by using the stored or generated electricity. The battery 996, for example, may include a rechargeable battery or a solar battery.

The indicator 997 may display a specific state of the electronic device 901 or part thereof (for example, the AP 910), for example, a booting state, a message state, or a charging state. The motor 998 may convert electrical signals into mechanical vibration. Although not shown in the drawings, the electronic device 901 may include a processing device (for example, a GPU) for mobile TV support. A processing device for mobile TV support may process media data according to the standards, such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some of components in an electronic device according to an embodiment of the present disclosure are configured as one entity, so that functions of previous corresponding components are performed identically.

Figure 10:
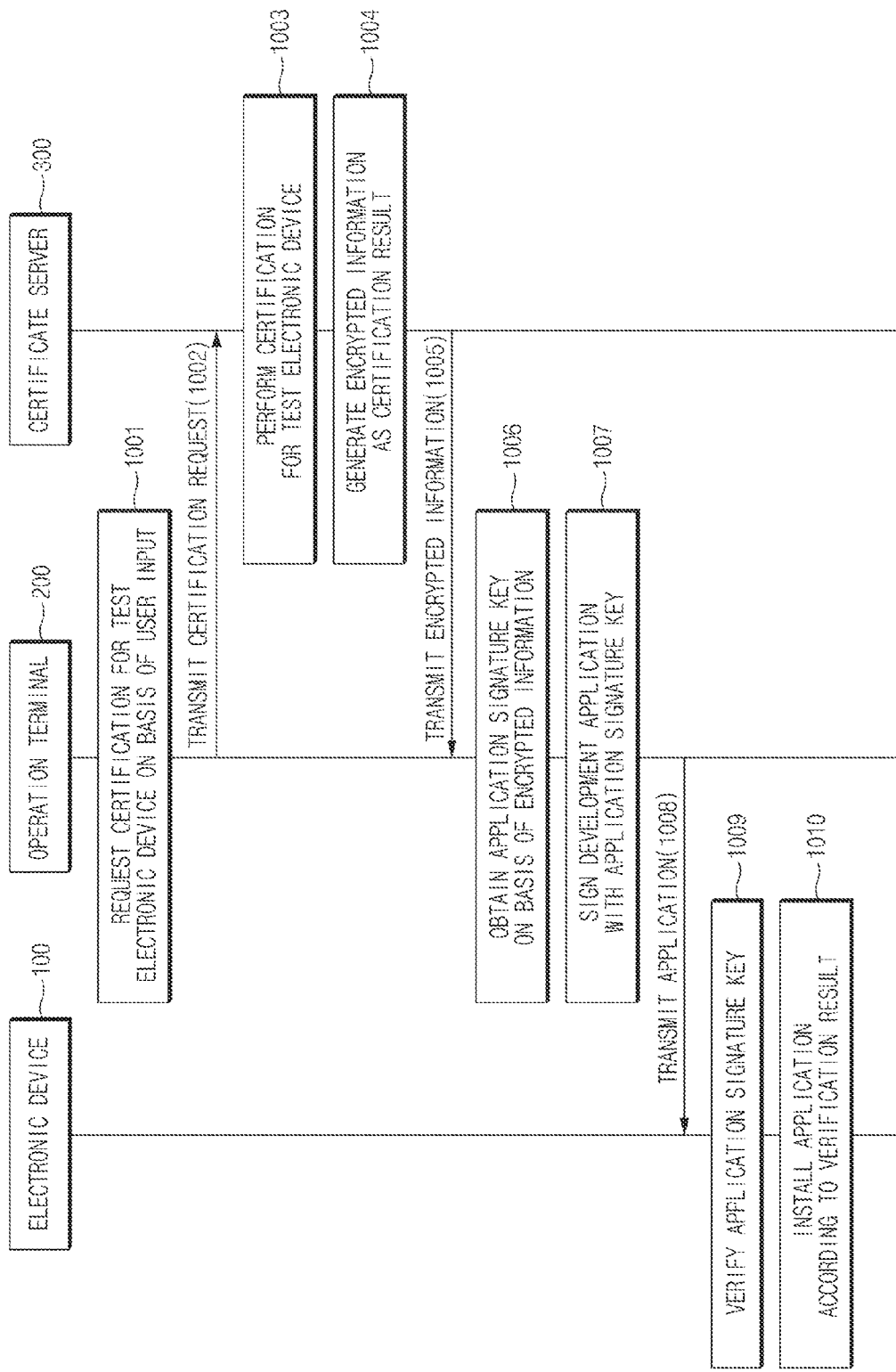
FIG. 10 is a flowchart illustrating a method of certifying an application in a certificate system according to various embodiments of the present disclosure.

FIG. 10 is a flowchart illustrating a method of certifying an application in a certificate system according to various embodiments of the present disclosure. The flowchart shown in FIG. 10 may be configured with operations processed in the certificate system shown in FIG. 1. Accordingly, even omitted contents, which are described for the certificate system shown in FIG. 1, may be applied to the flowchart of FIG. 10.

Referring to FIG. 10, in operation 1001, the operation terminal 200 may request a certification for the test electronic device based on developer information inputted by a user and information on the test electronic device. According to various embodiments of the present disclosure, the certification request may further include at least one of application privilege information, application information, and an expiration date.

In operation 1002, the operation terminal 200 transmits the certification request to the certificate server 300. The certification request may be transmitted to the certificate server 300 through e-mail, web, and another electronic device.

In operation 1003, the certificate server 300 may perform a certification on the test electronic device in response to the certification request. According to an embodiment of the present disclosure, the certificate server 300 may perform a certification based on a developer's development history or whether information necessary for certification is missed in response to the received certification request. For example, if there is a problem with the past history of an application that a developer develops, the certificate server 300 may not certify the developer in response to the certification request.

In operation 1004, the certificate server 300 may generate encrypted information including application privilege information and the unique ID of a test electronic device as the certification result. The certificate server 300 may be a server of a certificate authority performing certification. The encrypted information may include information obtained by encrypting the application signature key or information obtained by encrypting an application certificate for generating the application signature key.

In operation 1005, the certificate server 300 transmits the encrypted information to the operation terminal 200. The encrypted information generated from the certificate server 300 may be transmitted to the operation terminal 200 through e-mail, web, and another electronic device.

In operation 1006, the operation terminal 200 obtains the application signature key based on the encrypted information. According to an embodiment of the present disclosure, the operation terminal 200 may receive an encrypted application signature key from the certificate server 300, decrypt the encrypted application signature key, and obtain the application signature key.

According to an embodiment of the present disclosure, the operation terminal 200 may receive an encrypted application signature key from the certificate server 300 and may then generate the application signature key based on the encrypted application certificate. For example, the operation terminal 200 may generate an application signature key based on information on a test electronic device in the certification request and an encrypted application certificate received from the certificate server 300.

In operation 1007, the operation terminal 200 signs a development application with an application signature key. According to an embodiment of the present disclosure, a software development kit (SDK) for developing application may sign the development application with the application signature key.

In operation 1008, the operation terminal 200 transmits the application to the electronic device 100. In operation 1001 to operation 1007, an application including an application signature key may be generated. The generated application may be transmitted to the electronic device 100 having an environment where the application is used.

In operation 1009, the electronic device 100 verifies an application signature key. The electronic device 100 may determine whether the received application includes an application signature key and may determine whether an application signature key is certified by a certificate authority. Additionally, the electronic device 100 may determine whether the application signature key matches a development signature key or a commercial signature key stored in the electronic device 100. If the application signature key corresponds to the development application signature key, the electronic device 100 determines whether the electronic device 100 corresponds to information on a test electronic device in an application signature key.

In operation 1010, the electronic device 100 installs the application according to a verification result. If an application not including an application signature key is received, a corresponding application is not installed to the electronic device 100. Additionally, if an application includes an application signature key but the application signature key is not certified by a certificate authority, a corresponding application is not installed to the electronic device 100.

As mentioned above, a development application may be installed to or executed on only a test electronic device registered in a certificate authority through the certification of a developer and a test electronic device. Only a commercial application distributed by a commercial authority may be installed to an electronic device other than a test electronic device.

Additionally, an application that does not include an application signature key or an application signature key certified by a commercial authority or a certificate authority may be limited not to be installed to or executed on an electronic device.

Accordingly, the modification or copy of an application may be prevented and also an immediate action for vicious developers or applications including vicious codes may be possible.

The term "module" used in this disclosure, for example, may mean a unit including a combination of at least one of hardware, software, and firmware. The term "module" and the term "unit", "logic", "logical block", "component", or "circuit" may be interchangeably used. The term "module" may be a minimum unit or part of an integrally configured component. The term "module" may be a minimum unit performing at least one function or part thereof. The term "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, may be implemented using an instruction stored in computer-readable storage media. If at least one processor (for example, the processor 120) executes an instruction, the at least one processor may perform a function corresponding to the instruction. The computer-readable storage media may include the memory 130, for example. At least part of a programming module may be implemented (for example, executed) by processor 120, for example. At least part of a programming module may include a module, a program, a routine, sets of instructions, or a process to perform at least one function, for example.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module of a programming module according to various embodiments may include at least one of the above-mentioned components or additional other components. Alternatively, some programming modules may be omitted. Operations performed by a module, a programming module, or other components according to various embodiments of the present disclosure may be executed through a sequential, parallel, repetitive or heuristic method. Additionally, some operations may be executed in a different order or may be omitted. Alternatively, other operations may be added.

According to various embodiments of the present disclosure, in relation to a storage medium for storing instructions, if being executed by at least one processor, the instructions are set to allow at least one processor to perform at least one operation. The at least one operation includes receiving an application in the electronic device, determining an application signature key in the application, if the application signature key matches a development signature key among the development signature key and a commercial signature key, verifying the application signature key in relation to whether the electronic device corresponds to information on a test electronic device defined in the application signature key, and installing the application based on a verification result of the application signature key.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing application installation, the method comprising:
   receiving an application by an electronic device;
   determining an application signature key included in the application;
   determining whether the application signature key matches a development signature key or a commercial signature key;
   determining whether the electronic device corresponds to information on a test electronic device defined in the application signature key;
   if the application signature key matches the development signature key and the electronic device corresponds to the information on the test electronic device, installing the application based on a verification result of the application signature key;
   if the application signature key matches the development signature key and the electronic device does not correspond to the information on the test electronic device, preventing installation of the application; and
   if the application signature key matches the commercial signature key, installing the application,
   wherein the verifying of the application signature key comprises:
      determining data or functions of the electronic device that the application accesses; and
      verifying the application signature key in relation to whether the data or functions of the electronic device that the application accesses are out of an application privilege range defined in the application signature key based on the determined result, and
   wherein the application signature key comprises application privilege information encrypted by a certificate authority and a unique ID of a test electronic device.

2. The method of claim 1, wherein the verifying of the application signature key comprises verifying the application signature key in relation to whether a unique ID of the electronic device corresponds to a unique ID of the test electronic device included in the application signature key.

3. The method of claim 2, wherein the installing of the application comprises, if the unique ID of the electronic device does not correspond to the unique ID of the test electronic device included in the application signature key, not installing the application.

4. The method of claim 1, wherein the installing of the application comprises, if the data or functions of the electronic device that the application accesses are out of the application privilege range defined in the application signature key, not installing the application.

5. The method of claim 1, wherein the application signature key further comprises at least one of application information encrypted by a certificate authority or an expiration date.

6. The method of claim 1, wherein the unique ID of the test electronic device is at least one of embedded multimedia card (emmc) ID, international mobile station equipment identity (IMEI), or MAC address.

7. The method of claim 1, further comprising, if the application signature key matches the commercial signature key, installing the application to the electronic device.

8. The method of claim 1, further comprising, if the application signature key does not match one of the development signature key and the commercial signature key, not installing the application.

9. An electronic device comprising:
   a communication interface configured to receive an application;
   a processor;
   an application certificate module configured to:
      determine an application signature key included in the application,
      determine whether the application signature key matches a development signature key or a commercial signature key,
      determine whether the electronic device corresponds to information on a test electronic device defined in the application signature key,
      install, if the application signature key matches the development signature key and the electronic device corresponds to the information on the test electronic device, by the processor, the application based on a verification result of the application signature key,
      prevent installation of the application, if the application signature key matches the development signature key and the electronic device does not correspond to the information on the test electronic device, and
      install, if the application signature key matches the commercial signature key, by the processor, the application,
   wherein the verifying of the application signature key comprises:
      determining data or functions of the electronic device that the application accesses; and
      verifying the application signature key in relation to whether the data or functions of the electronic device that the application accesses are out of an application privilege range defined in the application signature key based on the determined result, and
   wherein the application signature key comprises application privilege information encrypted by a certificate authority and a unique ID of a test electronic device.

10. The device of claim 9,
    wherein the application certificate module is further configured to verify the application signature key in relation to whether a unique ID of the electronic device corresponds to a unique ID of a test electronic device included in the application signature key, and
    wherein the processor does not install the application if the unique ID of the electronic device does not correspond to the unique ID of the test electronic device included in the application signature key.

11. The device of claim 9,
    wherein the application certificate module is further configured to verify the application signature key in relation to whether the data or functions of the electronic device that the application accesses are out of an application privilege range defined in the application signature key, and
    wherein the processor does not install the application if the data or functions of the electronic device that the application accesses are out of an application privilege range defined in the application signature key.

* * * * *